United States Patent [19]
Hehl et al.

[11] Patent Number: 5,256,010
[45] Date of Patent: Oct. 26, 1993

[54] MACHINE TOOL

[75] Inventors: Holger Hehl, Tuttlingen; Rudolf Haninger, Seitingen-Oberflacht, both of Fed. Rep. of Germany

[73] Assignee: Chiron-Werke GmbH & Co. KG, Tuttlingen, Fed. Rep. of Germany

[21] Appl. No.: 890,614

[22] Filed: May 28, 1992

[30] Foreign Application Priority Data

Jun. 1, 1991 [DE] Fed. Rep. of Germany ....... 4118021

[51] Int. Cl.$^5$ .................................................. B23B 49/00
[52] U.S. Cl. .................................... 408/11; 408/16; 408/159
[58] Field of Search ................ 82/1.2; 408/10, 11, 408/13, 16, 93, 159

[56] References Cited

U.S. PATENT DOCUMENTS

| | | | |
|---|---|---|---|
| 3,806,271 | 4/1974 | Ishiguro et al. | 408/159 |
| 4,729,699 | 3/1988 | Frazzoli | 408/159 |

FOREIGN PATENT DOCUMENTS

| | | | |
|---|---|---|---|
| 2517235 | 6/1983 | France | 408/13 |
| 60906 | 3/1991 | Japan | 408/13 |

*Primary Examiner*—Daniel W. Howell
*Attorney, Agent, or Firm*—Pretty, Schroeder, Brueggemann & Clark

[57] ABSTRACT

A machine tool is disclosed having an inverted spotfacer chucked in a rotatable tapered spindle socket. The inverted spotfacer comprises an actuation shaft being rigidly axially connected to a tapered shank which, in turn, is chucked in the socket. A shoulder element can be displaced on the actuation shaft against the force of a spring. Further, a positive control mechanism acts between the actuation shaft and the shoulder element. Due to the action of the positive control mechanism, when axially displacing the actuation shaft relative to the shoulder element, a cutting tool arranged tiltably at the lower end of the actuation shaft may be tilted between two operational positions. In the first operational position the cutting tool extends parallel to the longitudinal axis of the spotfacer, whereas in the second operational position the cutting tool extends perpendicularly to the spotfacer axis, the second operational position being the position in which the spotfacer may make countersunk bores on workpieces. A sensor is provided for sensing the relative position of the shoulder element on the actuation shaft. The sensor is connected to an electronic control unit comparing the detected axial position with a reference value.

4 Claims, 1 Drawing Sheet

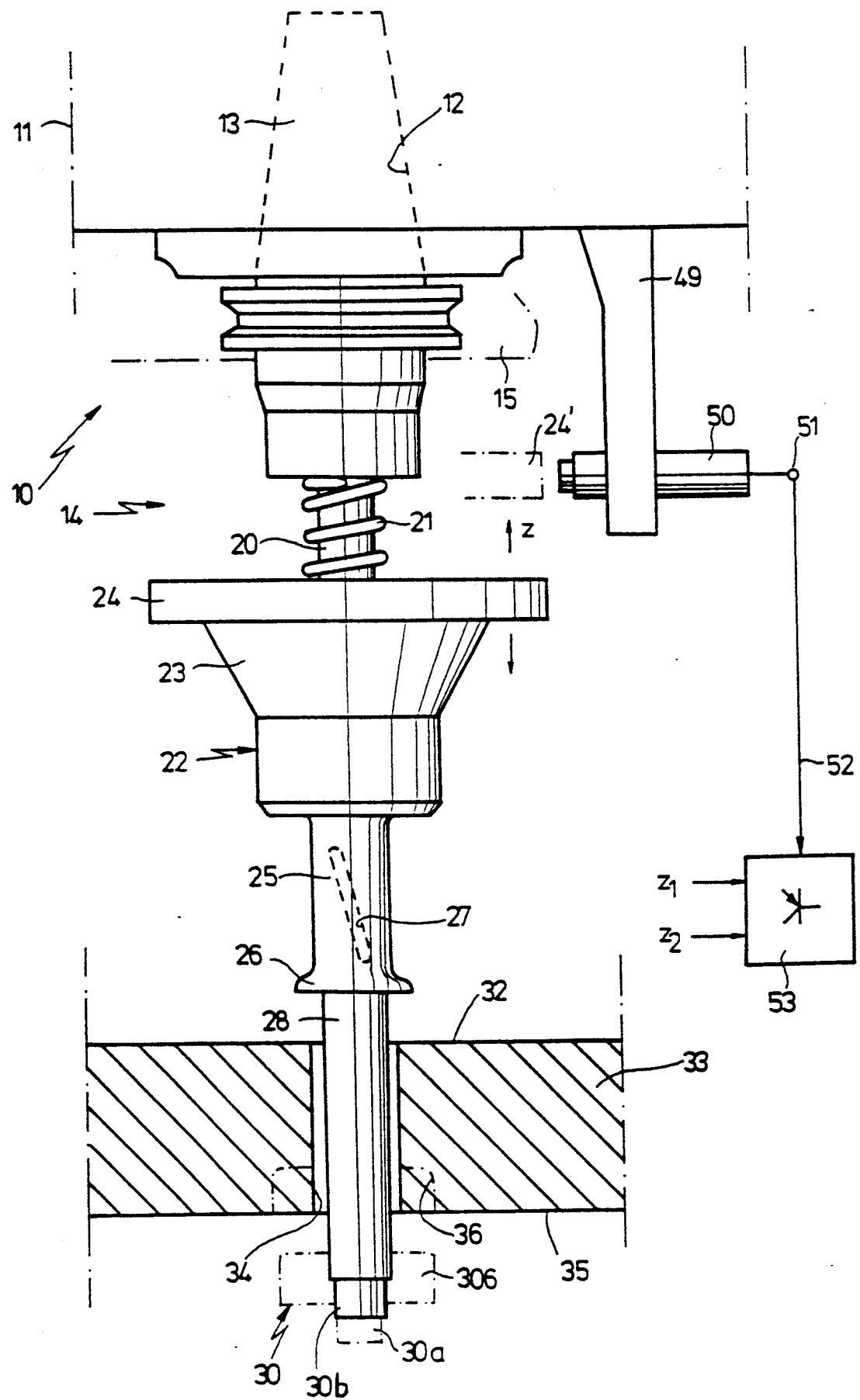

MACHINE TOOL

The invention concerns a machine tool with an inverted spotfacer which comprises an actuation shaft that is rigidly axially joined to a taper shank of the inverted spotfacer that is chucked in a socket of a spindle of the machine tool; a shoulder element that can be displaced on the actuation shaft against the force of a spring; and a positive control mechanism acting between the actuation shaft and shoulder element, by means of which, as a result of axial displacement of the actuation shaft relative to the shoulder element, an elongated cutter at a lower end of the actuation shaft can be moved back and forth between a first stable position in which the cutter is oriented axially, and a second stable position in which the cutter is oriented radially.

An inverted spotfacer for a machine tool of the aforesaid type is known from German published application 34 29 971.

The known inverted spotfacer is used to produce a countersunk hole in a through hole on a workpiece clamped on a workpiece table, on the side facing away from the tool, either because this side of the workpiece is, for example, designed as a cavity and is inaccessible to a tool, or in order to eliminate reclamping.

The known inverted spotfacer operates in the manner of a retractable pen, in which two axial actuations of an actuation shaft can first extend the pen tip and then retract it. In the known inverted spotfacer, the actuation shaft can also be displaced relative to a shoulder element, specifically against the force of a spring. The positive control mechanism between the two parts, which, as mentioned, operates in the manner of a retractable pen mechanism, makes it possible to snap the actuation shaft into place in two axial end positions relative to the shoulder element. In one of the two axial end positions, the actuation shaft extends at the lower end of the inverted spotfacer a cutter that is elongated in design and was initially arranged axially, so that it did not project laterally beyond the lower section of the inverted spotfacer. When the cutter is extended, however, it folds out from the axial orientation into a radial orientation, and now extends laterally far beyond the circumference of the lower section of the inverted spotfacer.

To perform a machining step, first the inverted spotfacer, with the cutter folded in, is passed through a previously made through hole in the workpiece; the actuation shaft is rigidly joined to the taper shank of a tool holder, which in turn is chucked in a socket of a spindle of the machine tool.

The spindle is then moved relative to the workpiece, usually by moving the spindle towards the workpiece while the workpiece is arranged immovably on a workpiece table.

The shoulder element is provided with a thickened section that is located in the center region of the shoulder element. As a result, the lower, tapering portion of the shoulder element can be inserted, together with the lower part of the actuation shaft and the still folded-in cutter, through the through hole until the thickened section of the shoulder element comes into contact with the surface of the workpiece facing the spindle. If the spindle is then moved farther towards the workpiece, the actuation shaft moves axially, together with the spindle, against the force of the spring relative to the shoulder element, which as a result of the aforesaid system now remains stationary on the workpiece. As a result, the positive control mechanism in the inverted spotfacer is actuated, and the cutter, now located beneath the workpiece, is folded out from the axial orientation into the radial orientation. The inverted spotfacer can now be pulled back in by correspondingly moving the spindle in the opposite direction, so that the cutter applies the desired countersunk hole on the reverse side of the workpiece. In this machining position, the thickened section of the shoulder element is once again elevated away from the surface of the workpiece.

When machining is finished, the spindle once again travels towards the workpiece and again brings the thickened section of the shoulder element into contact with the surface of the workpiece. When the actuation shaft is again retracted into the shoulder element (once again against the force of the spring), the positive control mechanism is in turn actuated with the opposite effect, and folds the cutter away from the radial orientation back to the axial orientation, so that finally the lower section of the inverted spotfacer can be pulled back out of the through hole in the workpiece.

It has been found that in practice, malfunctions occasionally occur if one or the other stable position of the actuation shaft relative to the shoulder element is not assumed because of a malfunction, and the cutter therefore is not folded out before the machining procedure begins, or is not folded back in after the machining procedure ends. The latter, especially, can occur if the chips produced during machining get into the cutter folding mechanism and jam the cutter, so that the latter cannot be properly folded back into the axial orientation.

While the former malfunction (improper folding out) has no significant consequences, since in this case the workpiece simply is not machined, the second malfunction can in some circumstances have major consequences, specifically because the spindle attempts to pull the lower section of the inverted spotfacer back out of the through hole in the workpiece even though the cutter is still folded out radially. This can cause considerable damage to the workpiece, to the inverted spotfacer, and also to the actuation mechanisms and spindle guides.

The object underlying the invention is therefore that of developing a machine tool of the aforesaid type in such a way that such malfunctions are eliminated or at least detected, so that in the latter case a remedy can be applied before damage occurs.

This object is achieved, in accordance with the invention, by the fact that a sensor to detect the relative position of the actuation shaft with respect to the shoulder element is provided, and that the sensor is connected to a control unit in which the detected position is compared to a reference value.

The object underlying the invention is completely achieved in this manner.

The aforesaid features have the specific advantage that proper operation of the positive control mechanism can be checked at each machining procedure, with the result that in the event of a malfunction, the machine can be stopped and the malfunctions can be remedied manually by a operator. In particular, it is no longer possible for an inverted spotfacer to be pulled back when a cutter is still extended, thus possibly causing considerable damage to the machine tool.

The inference as to the relative position of the actuation shaft with respect to the shoulder element is sufficient to detect such malfunctions because the positive control mechanism, as the term itself indicates, can only reach its two end positions if the cutter has also occupied its two corresponding end positions. If, therefore, in a typical malfunction due to chips of material, the cutter fails to fold in from the radial orientation into the axial orientation because the cutter becomes jammed while moving, this necessarily means that the positive control mechanism also cannot occupy its end position because it is not capable of carrying the cutter along into the desired axial end position.

The invention therefore provides an extremely reliable means of monitoring the inverted spotfacer.

It is self-evident that "detecting the relative position" implies both continuous and discrete monitoring. For example, it is possible to use multiple sensors to detect various positions of the shoulder element relative to the actuation shaft, which is advantageous, for example, if the relative position is different in the two end positions.

In a preferred embodiment of the invention, the sensor is designed as a proximity sensor, and is rigidly joined to the spindle in such a way that a projecting section of the shoulder element passes by the sensor as it moves axially relative to the actuation shaft.

The advantage of this feature is that the position detector functions only as an event detector, making it possible to work only with reference marks, movement of which past a sensor triggers a corresponding event signal. Otherwise it would be necessary to provide a lengthwise marking so that the entire displacement travel could be continuously detected. In most cases, however, this is not necessary.

It should also be noted at this point that the sensor can of course be arranged on any of the elements that move with respect to one another, for example either on the shoulder element or on the actuation shaft, with the respective other part then bearing the marking. The word "on" in this connection is to be understood as any rigid connection of the elements.

In a further preferred embodiment of the invention, the projecting section is designed as a circumferential rim of the shoulder element.

The advantage of this feature is that reliable detection is possible even with a rotating tool. Specifically, when the inverted spotfacer is, for example, rotating about a vertical axis, the sensor is arranged in a horizontal plane, and the rotating shoulder element is additionally being moved vertically, movement of the circumferential rim past the sensor will be detected in every case, regardless of whether the rim is stationary or rotating, since in every case a reference element of the shoulder element will be located opposite the sensor.

It must be noted at this juncture that "sensor" is to be understood in this instance as any type of sensor that can be used for such purposes. These include especially magnetic, capacitative, and optical sensors, as are known in the art.

In a further exemplary embodiment of the invention, the control unit comprises a time controller that compares the occurrence of sensor signals with a movement sequence of the spindle during retraction of the inverted spotfacer into a through hole of a workpiece.

The advantage of this feature is that plausibility checks are possible.

Specifically, if the inverted spotfacer is, for example, moved through the through hole with the cutter folded in axially, it is possible, on the basis of the retraction speed of the spindle and the dimensions of the lower section of the inverted spotfacer, to define a time window within which a sensor signal indicating unfolding of the cutter from the axial orientation into the radial orientation must occur.

If, however, the signal does not occur within the said time window, a malfunction can immediately be inferred, consisting in this case of the fact that the cutter was not extended. In this case the controller can provide for the inverted spotfacer to be immediately pulled back out and a corresponding alarm to be given, so that an operator can replace the obviously defective inverted spotfacer with another inverted spotfacer.

Further advantages are evident from the description and the attached drawing.

It is self-evident that the features mentioned previously and those yet to be explained below can be applied not only in the particular combination indicated, but also in other combinations or in isolation, without thereby going beyond the context of the present invention.

An exemplary embodiment of the invention is depicted in the drawing and will be explained in more detail in the description which follows.

The single FIGURE shows a side view of an inverted spotfacer, chucked in a machine tool in accordance with the invention, which is working on a workpiece.

In the FIGURE, 10 designates in its entirety a machine tool (only partially depicted), especially a vertical-axis machining center as is used for numerically controlled execution of drilling and milling operations on workpieces.

11 indicates, very schematically, a spindle of the machine tool 10, which can travel in directions including the vertical (as drawn in FIG. 1).

A socket 12 in the spindle 11 serves to hold a taper shank 13 of an inverted spotfacer 14. The inverted spotfacer 14 is preferably held in a gripper 15 (indicated only schematically) of a tool changer, also of a design known in the art.

The inverted spotfacer 14 comprises a central shaft 20 which is rigidly joined to the taper shank 13. The shaft is braced by a spring 21 against a shoulder element 22, which is designed as a sleeve and can be displaced axially on the shaft 20 against the force of the spring 21.

The shoulder element 22 comprises at its upper end a funnel-shaped section 23 which comprises a radially thickened upper rim 24. The upper rim 24 is preferably made of a metal.

Adjoining the funnel-shaped section 23 at the bottom is a tubular element 25 which is provided in its central region with a radially thickened shoulder 26. Below the shoulder 26, the tubular element 25 continues into a downward-facing tapered section 28.

27 indicates a positive control mechanism that acts between the shoulder element 22 and the shaft 20. The positive control mechanism 27 can, for example, comprise a helical track in which a pin runs, in order to convert an axial movement of the shaft 20 with respect to the shoulder element 22 into a rotation. As a result of this combined movement sequence, a cutter 30 is folded out at the end of the section 28 or the shaft 20.

The cutter 30 is depicted in the FIGURE in a first stable position 30a, wherein it is axially oriented and thus does not project beyond the outer contour of the section 28.

30b indicates a second stable position of the cutter 30, in which the latter is folded out through 90 degrees so that it now projects radially far beyond either side of the section 28.

The positive control mechanism 27 operates in general like a retractable pen mechanism, with the shaft 20 being moved axially relative to the shoulder element 22 so that the first time the said elements 20, 22 are pushed together beyond a pressure point, the cutter 30 is brought into the folded-out position, while after another actuation of the positive control mechanism 27, it is folded back into the other position 30a in the axial orientation.

The positive control mechanism 27 is known in the art and is not an object of the present invention.

In practical use, the spindle 11 with the inverted spotfacer 14 is located above an upper surface (front side) 32 of a workpiece 33, which is, for example, clamped on a stationary workpiece table.

In a machining step performed previously, the workpiece 33 was provided with a through hole 34, the diameter of which is greater than the outside diameter of the section 28, but smaller than the outside diameter of the shoulder 26.

The spindle 11 is now moved so that its axis aligns with the axis of the through hole 34, and it is then moved downward (as depicted in the FIGURE) until the section 28 of the shoulder element 22 goes into the through hole 34 and passes through it, until finally the shoulder 26 of the shoulder element 22 comes into contact with the front side 32 of the workpiece 33.

While the shoulder element 22 is now stationary in contact with the front side 32, the spindle 11 is moved farther downward, with the result that the shaft 20 moves axially relative to the shoulder element 22, against the force of the spring 21.

The lower end of the shaft 20 and the section 28 thus already projects beyond the lower surface (back side) 35 of the workpiece 33, as depicted in the FIGURE.

When the pressure point of the positive control mechanism 27 is reached, the cutter 30 folds out from its previous position 30a into the extended position 30b.

The spindle 11 is now moved back up, with the result that the shoulder element 22 is also once again elevated from the front side 32 of the workpiece 33.

As it correspondingly travels upward, the cutter 30 then engages with the back side 35 of the workpiece 33, where it produces an intended countersunk hole 36.

A sensor 50 is rigidly joined to the spindle 11 by means of an arm 49. The sensor 50 is active in a horizontal plane, and can operate, for example, magnetically, capacitatively, optically, or in any other way. With its left end surface in the FIGURE, the sensor 50 detects the approach of an object. Thus if the sensor 50 operates magnetically, it would detect the arrival of the preferably ferromagnetic metallic upper rim 24. The same applies to optical reflection sensors, eddy current sensors, Hall effect sensors, and the like.

The sensor 50 is connected via a connector 51 and a lead 52 to a control unit 53.

If the vertical travel direction of the spindle 11 is denoted z, reference values $z_1$, $z_2$, ... can then be sent to the control unit 53.

When the spindle 11 is in the position depicted in the FIGURE, the rim 24 is spaced away from the sensor 50 in the vertical axis (z axis), because the spring 21 is relaxed.

However, when the shoulder element then comes into contact the front side 32 of the workpiece 33, the spring 21 is compressed in the manner described, until, when the pressure point or end point of the positive control mechanism 27 is reached, the rim 24 occupies the end position indicated as 24' in the FIGURE, in which it is exactly opposite the sensor 50.

A corresponding signal is sent via the elements 51, 52 to the control unit 53, which then, by comparison with the reference values $z_1$ and $z_2$, can determine whether the desired end position has been reached.

For instances in which different pressure points are provided by the positive control mechanism 27 for the two alternating actions of folding the cutter 30 in and out, it is of course also possible to provide multiple sensors 50 and multiple reference values $z_1$, $z_2$, ....

The control unit 53 can moreover contain a time controller.

The purpose of this time controller is to check, when the spindle 11 is moving at a known travel speed, whether the signal from the sensor 50—indicating that the cutter has been folded out into the folded-out position 30b by actuation of the positive control mechanism 27—arrives at the expected time as the inverted spotfacer 14 is inserted into the through hole 34. If no such message arrives within a time window defined in this manner, this means that for some reason the cutter was not extended. The control unit 53 can then move the spindle 11 back out and at the same time issue an alarm, so that the malfunction can be remedied without loss of time.

We claim:

1. A machine tool having a rotatable tapered spindle socket with an inverted spotfacer tool chucked therein for providing workpieces with countersunk bores, said spotfacer tool comprising:
   a tapered shank mating said tapered spindle socket;
   an elongate actuation shaft having a longitudinal axis and an upper end being rigidly connected to said tapered shank, and having a lower end;
   cutting means having a cutting edge and being arranged on said lower end of said actuation shaft, said cutting means being tiltable about an axis perpendicular to said longitudinal axis between a first stable operational position with said cutting edge extending perpendicular to said longitudinal axis, and a second stable operational position with said cutting edge extending parallel to said longitudinal axis;
   a shoulder element being axially displaceable on said actuation shaft against the action of a spring means;
   positive control means acting between said actuation shaft and said shoulder element for tilting said cutting means between said first and said second operational positions when said shoulder element is displaced in its axial position on said actuation shaft between two predetermined axial end positions;
   sensor means for sensing said axial position of said shoulder element on said actuation shaft; and
   electronic control means coupled to said sensor means for comparing said sensed axial position with a reference position value.

2. The machine tool according to claim 1, wherein said sensor means is designed as a proximity sensor, and is rigidly connected to said spindle, a projecting section of said shoulder element passing by said sensor as said sensor moves axially relative to said actuation shaft.

3. The machine tool according to claim 2, wherein said projecting section is designed as a circumferential rim of said shoulder element.

4. The machine tool according to claim 2, wherein said electronic control means comprises a time controller and memory means for comparing occurrence of sensor signals with a predetermined sequence of spindle movements during retraction of said inverted spotfacer tool into said bore of said workpiece.

* * * * *